United States Patent
Kakui

(10) Patent No.: US 7,180,655 B2
(45) Date of Patent: Feb. 20, 2007

(54) BROAD-BAND LIGHT SOURCE

(75) Inventor: Motoki Kakui, Kanagawa (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 77 days.

(21) Appl. No.: 10/892,227

(22) Filed: Jul. 16, 2004

(65) Prior Publication Data

US 2005/0012986 A1    Jan. 20, 2005

(30) Foreign Application Priority Data

Jul. 17, 2003   (JP) .............................. 2003-276149

(51) Int. Cl.
*H01S 3/00* (2006.01)
(52) U.S. Cl. .............................. 359/341.41; 359/341.42
(58) Field of Classification Search ........... 359/341.41, 359/341.42; 372/12
See application file for complete search history.

(56) References Cited

U.S. PATENT DOCUMENTS

| | | | | |
|---|---|---|---|---|
| 4,938,556 A | * | 7/1990 | Digonnet et al. ...... | 359/341.31 |
| RE35,946 E | * | 11/1998 | Ainslie et al. ............... | 385/127 |
| 6,658,189 B2 | * | 12/2003 | Ajima et al. ................. | 385/123 |
| 6,900,885 B2 | * | 5/2005 | Masuda et al. ............. | 356/147 |
| 2002/0191415 A1 | * | 12/2002 | Takei et al. .................. | 362/551 |
| 2003/0035204 A1 | * | 2/2003 | Ahn et al. ............... | 359/341.3 |
| 2005/0276564 A1 | * | 12/2005 | Kakui et al. ................ | 385/141 |

FOREIGN PATENT DOCUMENTS

JP    2002-329907    11/2002

* cited by examiner

*Primary Examiner*—Deandra M. Hughes
(74) *Attorney, Agent, or Firm*—McDermott Will & Emery LLP

(57) ABSTRACT

A broad-band light source has a reduced tendency to oscillate and has high efficiency. The broad-band light source comprises (a) an optical waveguide that comprises a optical active element to generate an ASE lightwave when a pumping lightwave is supplied, that outputs an ASE lightwave in a first wavelength band from its first end, and that outputs an ASE lightwave in a second wavelength band from its second end, (b) a pumping lightwave-supplying means for supplying a pumping lightwave to the optical active element, and (c) a lightwave-combining means that receives the ASE lightwave in the first wavelength band, that receives the ASE lightwave in the second wavelength band, that combines the received ASE lightwaves, and that outputs the resultant ASE lightwave.

8 Claims, 13 Drawing Sheets

BROAD-BAND LIGHT SOURCE

BACKGROUND OF THE INVENTION

1. Field of the Invention

The present invention relates to a light source that can output a broad-band lightwave.

2. Description of the Background Art

Light sources that can output a broad-band lightwave are useful in a field of optical measurement, for example. It is known that such light sources include a light source that outputs a lightwave generated by the amplified spontaneous emission (hereinafter referred to as an ASE lightwave). For example, the published Japanese patent application Tokukai 2002-329907 has disclosed a light source that uses an erbium-doped fiber (EDF) as an optical active element. FIG. 11 is a schematic diagram showing a conventional broad-band light source 8 disclosed in Tokukai 2002-329907. The light source 8 comprises (a) an optical waveguide including an EDF 81, (b) an optical coupler 82, an optical isolator 83, and an optical connector 88, all of which are placed at a first-end side of the optical waveguide, and (c) a reflector 89 placed at a second-end side of the optical waveguide.

In the broad-band light source 8, a pumping lightwave outputted from a pumping light source 84 enters the EDF 81 via the optical coupler 82 to generate an ASE lightwave in the EDF 81. In the EDF 81's region in the vicinity of the optical coupler 82, the population inversion is as relatively high as about 60% or more, for example. As a result, a gain peak lies in the C-band (1,530 to 1,565 nm). On the other hand, in the region far from the optical coupler 82, the population inversion is as relatively low as about 40%, for example. As a result, a gain peak lies in the L-band (1,565 to 1,625 nm). The ASE lightwave generated in the EDF 81 enters the optical isolator 83 either directly or after being reflected at the reflector 89. After passing through the optical isolator 83, the ASE lightwave is outputted from the optical connector 88. In other words, the light source 8 can output from the optical connector 88 an ASE lightwave lying over a broad band including both the C- and L-bands.

However, in the broad-band light source 8, the reflector 89 and the optical isolator 83 sandwiching the EDF 81 constitute a resonator, raising the possibility of oscillation. To prevent the oscillation, it is possible to design a broad-band light source 9 having a structure shown in FIG. 12. FIG. 12 is a schematic diagram showing a broad-band light source 9. The light source 9 comprises (a) a first optical waveguide including an EDF 91a, (b) an optical coupler 92a and an optical isolator 93a, both of which are placed at a first-end side of the first optical waveguide, (c) a second optical waveguide including an EDF 91b, (d) an optical coupler 92b and an optical isolator 93b, both of which are placed at a first-end side of the second optical waveguide. Second ends of the first and second optical waveguides are open ends.

A pumping lightwave outputted from a pumping light source 94a enters the EDF 91a. An adjustment is performed such that the level of population inversion in the EDF 91a becomes relatively high, so that an ASE lightwave having an intensity peak in the C-band is generated in the EDF 91a. A pumping lightwave outputted from a pumping light source 94b enters the EDF 91b. An adjustment is performed such that the level of population inversion in the EDF 91b becomes relatively low, so that an ASE lightwave having an intensity peak in the L-band is generated in the EDF 91b. The ASE lightwaves generated in the EDFs 91a and 91b are combined by an optical coupler 96. The resultant ASE lightwave is outputted from an optical connector 98. In other words, the light source 9 can output from the optical connector 98 an ASE lightwave lying over a broad band including both the C- and L-bands.

As described above, the broad-band light source 8 may oscillate. On the other hand, the broad-band light source 9 reduces the possibility of oscillation, because the second ends of the first and second optical waveguides are open ends. However, its intensity ratio of the output lightwave to the pumping lightwave is low, that is, it has low efficiency.

SUMMARY OF THE INVENTION

An object of the present invention is to offer a broad-band light source that has a reduced tendency to oscillate and that has high efficiency.

According to the present invention, the foregoing object is attained by offering the following broad-band light source. The broad-band light source comprises:

(a) an optical waveguide that:
   (a1) comprises at least one optical active element that generates an ASE lightwave when a pumping lightwave is supplied;
   (a2) outputs an ASE lightwave in a first wavelength band from a first end of the optical waveguide; and
   (a3) outputs an ASE lightwave in a second wavelength band from a second end of the optical waveguide;
(b) at least one pumping lightwave-supplying means for supplying a pumping lightwave to the at least one optical active element; and
(c) a lightwave-combining means that:
   (c1) receives the ASE lightwave in the first wavelength band;
   (c2) receives the ASE lightwave in the second wavelength band;
   (c3) combines the received ASE lightwaves to produce a resultant ASE lightwave; and
   (c4) outputs the resultant ASE lightwave.

The first and second wavelength bands may either be separated from each other or overlap each other.

Advantages of the present invention will become apparent from the following detailed description, which illustrates the best mode contemplated to carry out the invention. The invention can also be carried out by different embodiments, and their details can be modified in various respects, all without departing from the invention. Accordingly, the accompanying drawing and the following description are illustrative in nature, not restrictive.

BRIEF DESCRIPTION OF THE DRAWING

The present invention is illustrated to show examples, not to show limitations, in the figures of the accompanying drawing. In the drawing, the same reference signs and numerals refer to similar elements.

In the drawing.

DETAILED DESCRIPTION OF THE INVENTION (The First Embodiment)

Figure 13:
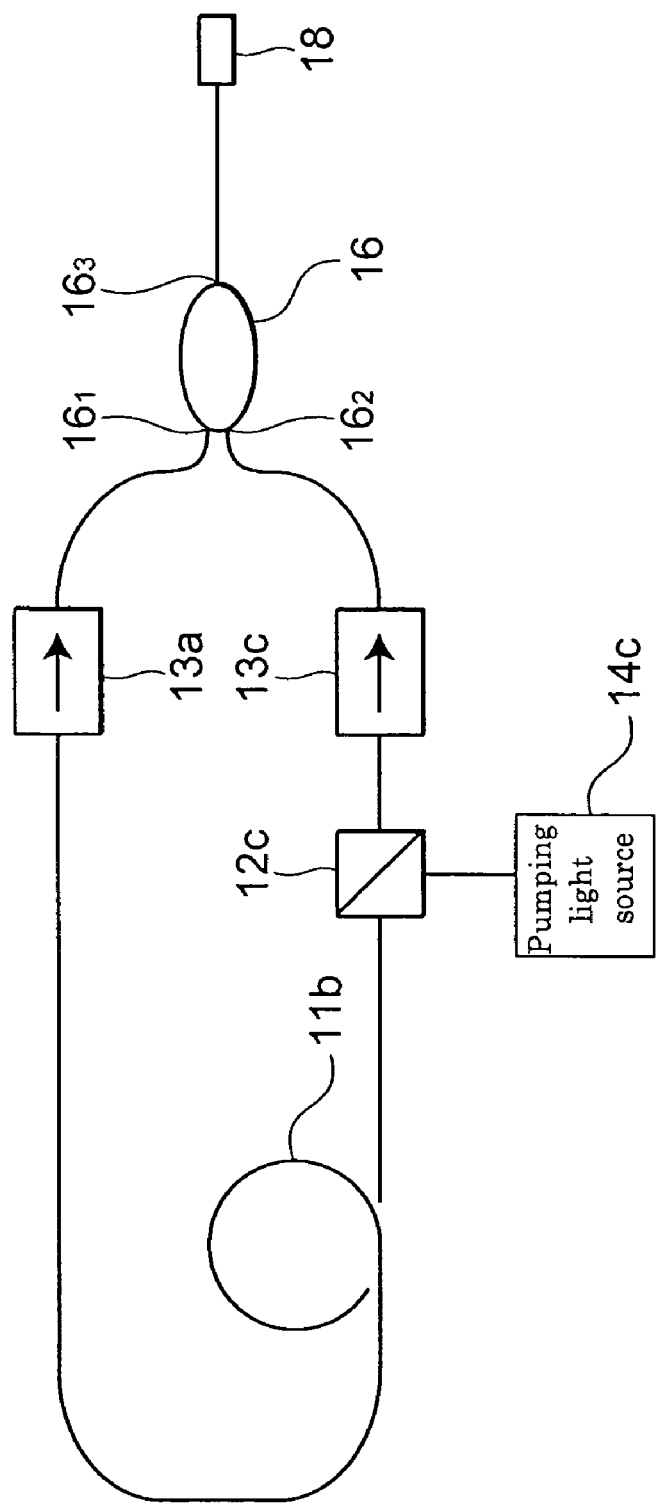
FIG. 13 is a schematic diagram showing a broad-band light source 7 of the first embodiment of the present invention.

First, the first embodiment of the broad-band light source of the present invention is explained below. FIG. 13 is a schematic diagram showing a broad-band light source 7 of the first embodiment. In the broad-band light source 7, an optical waveguide is structured between a first input port $16_1$ and a second input port $16_2$ of an optical coupler 16. A first end of the optical waveguide is connected to the first input port $16_1$ of the optical coupler 16, and a second end of it is connected to the second input port $16_2$ of the optical coupler 16.

The broad-band light source 7 comprises an optical isolator 13a, an EDF 11b, an optical coupler 12c, and an optical isolator 13c from the first end toward the second end in this order on the optical waveguide. The broad-band light source 7 further comprises (a) a pumping light source 14c connected to the optical coupler 12c and (b) an optical connector 18 connected to an output port tical coupler 12c and (b) an optical connector 18 connected to an output port $16_3$ of the optical coupler 16.

The EDF 11b is a silica glass-based optical fiber whose core region is doped with the element Er. The EDF 11b is used as a optical active element that generates an ASE lightwave when a pumping lightwave is supplied. The pumping lightwave has a wavelength lying in a 0.98-μm band or a 1.48-μm band, and the ASE lightwave has a wavelength lying in the C- or L-band.

The optical coupler 12c can both output an ASE lightwave having arrived from the EDF 11b to the optical isolator 13c and output a pumping lightwave having arrived from the pumping light source 14c to the EDF 11b. The optical isolator 13a transmits a lightwave in a direction from the EDF 11b to the optical coupler 16, but it does not transmit a lightwave in the opposite direction. The optical isolator 13c transmits a lightwave in a direction from the optical coupler 12c to the optical coupler 16, but it does not transmit a lightwave in the opposite direction.

The pumping light source 14c outputs a pumping lightwave to the optical coupler 12c. It is desirable to use a laser diode as the pumping light source 14c. The combination of the pumping light source 14c and the optical coupler 12c acts as a pumping lightwave-supplying means that supplies a pumping lightwave to the EDF 11b, a optical active element.

In the broad-band light source 7, the lightwave-combining means (optical coupler 16) is an optical coupler that has two input ports $16_1$ and $16_2$ and one output port $16_3$. The input port $16_1$ is connected to a first end of the optical waveguide, and the other input port $16_2$ is connected to a second end of the optical waveguide. The transmission properties from the input port $16_1$ to the output port $16_3$ and from the input port $16_2$ to the output port $16_3$ are different with each other. The transmittance from the input port $16_1$ to the output port $16_3$ is high at a first wavelength band, and the transmittance from the input port $16_2$ to the output port $16_3$ is high at a second wavelength band.

The broad-band light source 7 operates as follows. A pumping lightwave outputted from the pumping light source 14c is supplied to the EDF 11b via the optical coupler 12c. The EDF 11b supplied with the pumping lightwave generates an ASE lightwave.

Of the ASE lightwaves generated in the EDF 11b, the ASE lightwave heading for the optical isolator 13a passes through it and enters the first input port $16_1$ of the optical coupler 16. On the other hand, of the ASE lightwaves generated in the EDF 11b, the ASE lightwave heading for the optical coupler 12c passes through it and the optical isolator 13c in this order and enters the second input port $16_2$ of the optical coupler 16.

The ASE lightwave that is outputted from the first end of the optical waveguide and that enters the first input port $16_1$ of the optical coupler 16 has an intensity peak in the L-band. The ASE lightwave that is outputted from the second end of the optical waveguide and that enters the second input port $16_2$ of the optical coupler 16 has an intensity peak in the C-band. The ASE lightwave in the L-band and the ASE lightwave in the C-band are combined in accordance with the transmission property of the optical coupler 16. The resultant ASE lightwave is outputted from the output port $16_3$ of the optical coupler 16 and is finally outputted from the optical connector 18 to the outside.

The broad-band light source 7 has no reflector. In other words, it has no resonator structure. As a result, it has a reduced tendency to oscillate. In addition, the broad-band light source 7 combines the ASE lightwaves having arrived at both ends of the optical waveguide by the optical coupler 16 to output the resultant ASE lightwave. Therefore, it has high efficiency.

As described above, the broad-band light source 7 uses the optical coupler 16 that has two input ports $16_1$ and $16_2$ and one output port $16_3$. The transmission property from the first input port $16_1$ to the output port $16_3$ and the transmission property from the second input port $16_2$ to the output port $16_3$ are properly predetermined. Consequently, the intensity peak in the vicinity of the band boundary of the lightwave inputted into each of the two input ports $16_1$ and $16_2$ is suppressed. Under this condition, the resultant lightwave is outputted from the output port $16_3$.

(The Second Embodiment)

Figure 1:
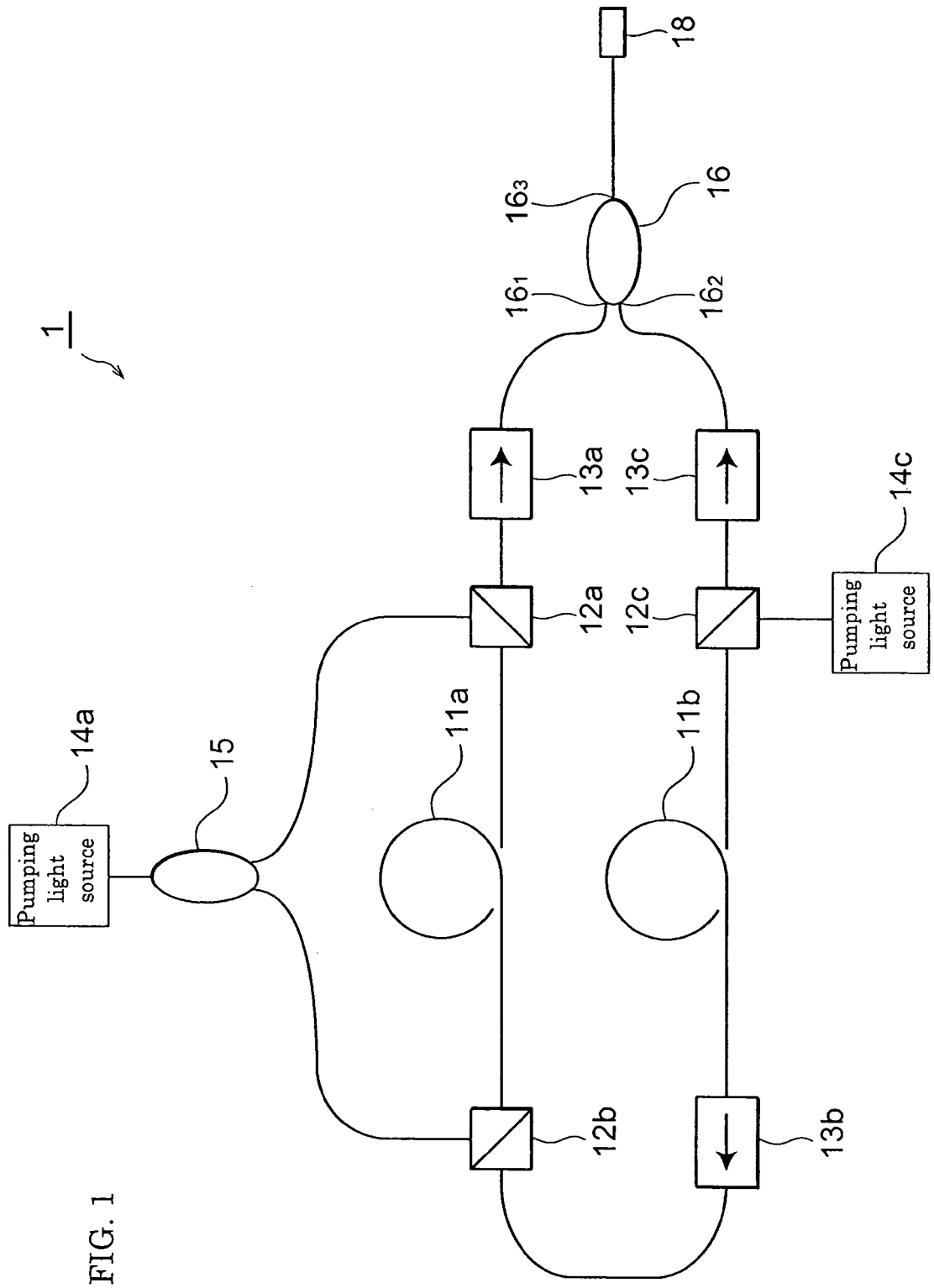
FIG. 1 is a schematic diagram showing a broad-band light source 1 of the second embodiment of the present invention.

Next, the second embodiment of the broad-band light source of the present invention is explained below. FIG. 1 is a schematic diagram showing a broad-band light source 1 of the second embodiment. The broad-band light source 1 differs from the foregoing broad-band light source 7 in that it further comprises an optical coupler 12a, an EDF 11a, an optical coupler 12b, and an optical isolator 13b on the optical waveguide. In addition, the broad-band light source 1 further comprises (a) an optical coupler 15 connected to the optical couplers 12a and 12b and (b) a pumping light source 14a connected to the optical coupler 15.

As with the EDF 11b, the EDF 11a is a silica glass-based optical fiber whose core region is doped with the element Er. The EDF 11a is used as an optical active element that generates an ASE lightwave when a pumping lightwave is supplied. The pumping lightwave has a wavelength lying in a 0.98-μm band or a 1.48-μm band, and the ASE lightwave has a wavelength lying in the C- or L-band.

The optical coupler 12a can both output an ASE lightwave having arrived from the EDF 11a to the optical isolator 13a and output a pumping lightwave having arrived from the optical coupler 15 to the EDF 11a. The optical coupler 12b can output an ASE lightwave having arrived from the EDF 11a to the optical isolator 13b, can output an ASE lightwave having arrived from the optical isolator 13b to the EDF 11a, and can output a pumping lightwave having arrived from the optical coupler 15 to the EDF 11a.

The optical isolator 13a transmits a lightwave in a direction from the optical coupler 12a to the optical coupler 16, but it does not transmit a lightwave in the opposite direction. The optical isolator 13b transmits a lightwave in a direction from the EDF 11b to the optical coupler 12b, but it does not transmit a lightwave in the opposite direction.

The pumping light source 14a outputs a pumping lightwave. The optical coupler 15 has a branching ratio of 3 dB. It bifurcates the pumping lightwave outputted from the pumping light source 14a. It outputs one of the bifurcated pumping lightwaves to the optical coupler 12a and outputs the other to the optical coupler 12b. The pumping light source 14c outputs a pumping lightwave to the optical coupler 12c. As with the pumping light source 14c, it is desirable to use a laser diode as the pumping light source 14a.

The combination of the pumping light source 14a and the optical couplers 15, 12a, and 12b acts as a pumping lightwave-supplying means that supplies pumping lightwaves to the EDF 11a, a optical active element.

Figure 2:
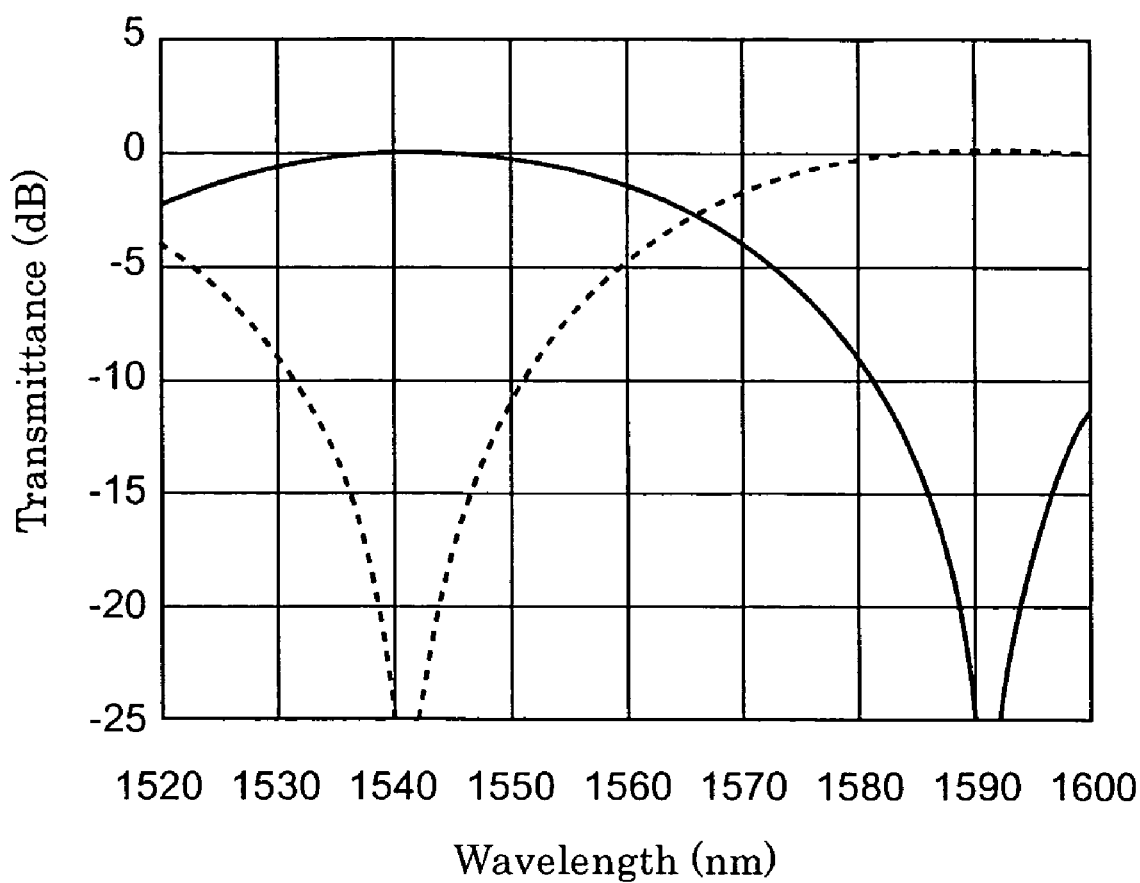
FIG. 2 is a graph showing a transmission property of an optical coupler 16 incorporated in a broad-band light source 1.

In the optical coupler 16, the transmission properties from the input port $16_1$ to the output port $16_3$ and from the input port $16_2$ to the output port $16_3$ are different with each other. The transmittance from the input port $16_1$ to the output port $16_3$ is high at a first wavelength band, and the transmittance from the input port $16_2$ to the output port $16_3$ is high at a second wavelength band. When these transmission properties are properly predetermined, the intensity peak in the vicinity of the band boundary of the lightwave inputted into each of the two input ports is suppressed. Under this condition, the resultant lightwave is outputted from the output port. FIG. 2 is a graph showing a transmission property of the optical coupler 16 incorporated in the broad-band light source 1. The transmission property from the first input port $16_1$ to the output port $16_3$ of the optical coupler 16 is shown by a broken line in FIG. 2. It shows that a transmittance peak lies in the L-band. The transmission property from the second input port $16_2$ to the output port $16_3$ of the optical coupler 16 is shown by a solid line in FIG. 2. It shows that a transmittance peak lies in the C-band. The optical connector 18 outputs to the outside an ASE lightwave outputted from the output port $16_3$ of the optical coupler 16.

The broad-band light source 1 operates as follows. A pumping lightwave outputted from the pumping light source 14a is bifurcated by the optical coupler 15. One of the bifurcated pumping lightwaves is supplied to the EDF 11a via the optical coupler 12a. The other is supplied to the EDF 11a via the optical coupler 12b. A pumping lightwave outputted from the pumping light source 14c is supplied to the EDF 11b via the optical coupler 12c. The EDFs 11a and 11b supplied with the pumping lightwaves generate an ASE lightwave.

Of the ASE lightwaves generated in the EDF 11a, the ASE lightwave heading for the optical coupler 12b passes through it and is blocked by the optical isolator 13b. On the other hand, of the ASE lightwaves generated in the EDF 11a, the ASE lightwave heading for the optical coupler 12a passes through it and the optical isolator 13a in this order and enters the first input port $16_1$ of the optical coupler 16.

Of the ASE lightwaves generated in the EDF 11b, the ASE lightwave heading for the optical isolator 13b passes through it and the optical coupler 12b in this order and enters the EDF 11a. Then, the ASE lightwave is amplified there, passes through the optical coupler 12a and the optical isolator 13a in this order, and enters the first input port $16_1$ of the optical coupler 16. On the other hand, of the ASE lightwaves generated in the EDF 11b, the ASE lightwave heading for the optical coupler 12c passes through it and the optical isolator 13c in this order and enters the second input port $16_2$ of the optical coupler 16.

The ASE lightwave that is outputted from the first end of the optical waveguide and that enters the first input port $16_1$ of the optical coupler 16 has an intensity peak in the L-band. The ASE lightwave that is outputted from the second end of the optical waveguide and that enters the second input port $16_2$ of the optical coupler 16 has an intensity peak in the C-band. The ASE lightwave in the L-band and the ASE lightwave in the C-band are combined in accordance with the transmission property shown in FIG. 2. The resultant ASE lightwave is outputted from the output port $16_3$ of the optical coupler 16 and is finally outputted from the optical connector 18 to the outside.

As with the broad-band light source 7, the broad-band light source 1 has a reduced tendency to oscillate and has high efficiency.

In the broad-band light source 1, the optical waveguide comprises a plurality of optical active elements, the EDFs 11a and 11b, and the pumping lightwave-supplying means comprising the pumping light source 14a and the optical couplers 15 and 12b supplies a pumping lightwave at an intermediate position of the optical waveguide. As a result, the pumping conditions of the EDFs 11a and 11b become different with each other. Consequently, the first and second ends of the optical waveguide can output an ASE lightwave lying in a band different from each other. In addition, in the broad-band light source 1, the optical waveguide comprises not only a plurality of optical active elements, the EDFs 11a and 11b, but also the optical isolator 13b placed at an intermediate position of the optical waveguide. As a result, the difference in the band between the ASE lightwaves outputted from the first and second ends of the optical waveguide can be increased. It is desirable that the optical coupler 12b and the optical isolator 13b be placed at a position other than the middle point of the optical waveguide.

(The Third Embodiment)

Figure 3:
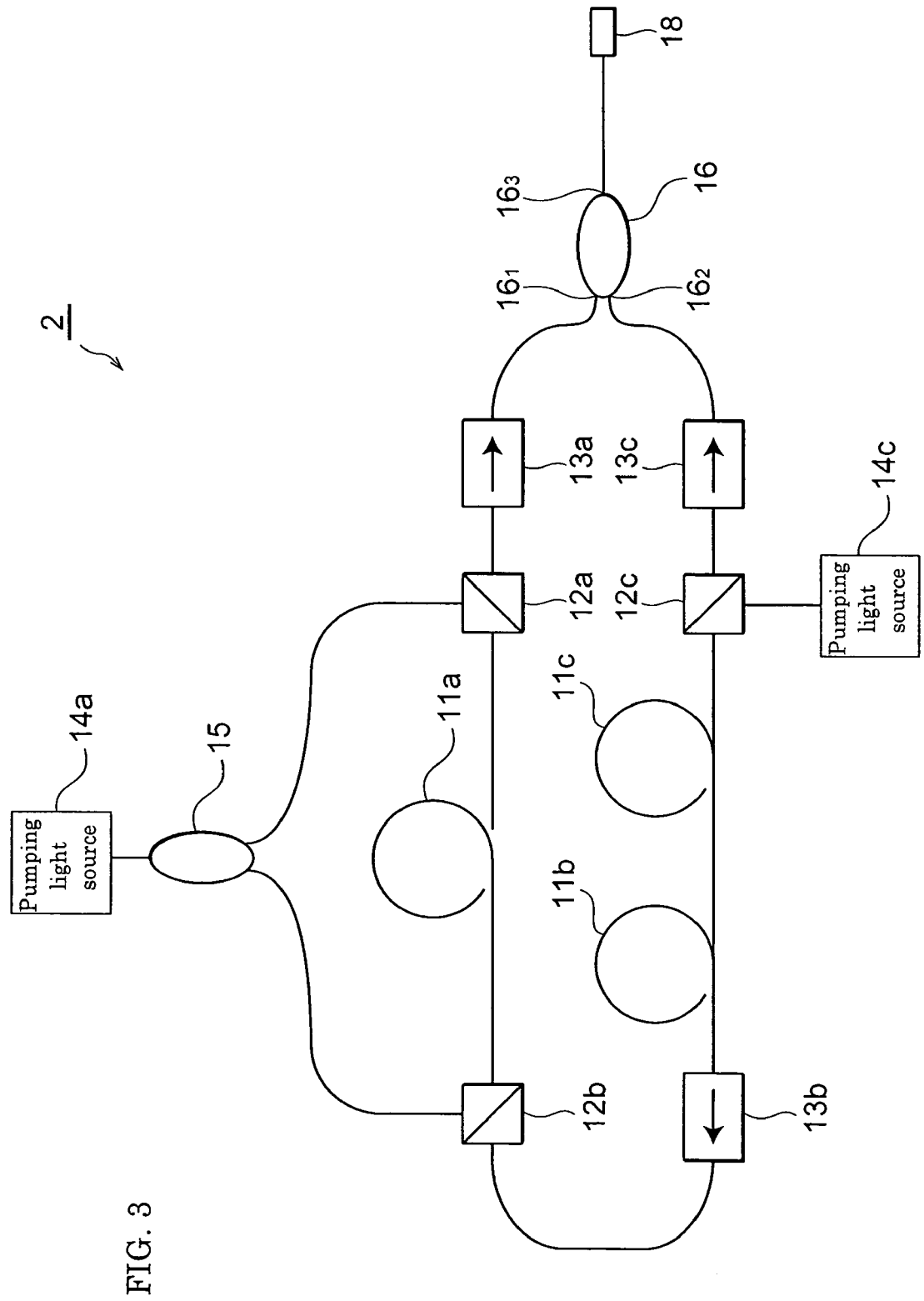
FIG. 3 is a schematic diagram showing a broad-band light source 2 of the third embodiment of the present invention.

Next, the third embodiment of the broad-band light source of the present invention is explained below. FIG. 3 is a schematic diagram showing a broad-band light source 2 of the third embodiment. The broad-band light source 2 differs from the broad-band light source 1 of the second embodiment in that it further comprises an EDF 11c.

The EDF 11c is placed between the EDF 11b and the optical coupler 12c. The EDF 11c is a silica glass-based optical fiber whose core region is doped with the element Er.

The EDF 11c is used as an optical active element that generates an ASE lightwave when a pumping lightwave is supplied. In the broad-band light source 2, the optical waveguide comprises a plurality of optical active elements, the EDFs 11b and 11c, each of which has a composition different from each other. More specifically, the EDF 11b is an EDF co-doped with the element Al, and the EDF 11c is an EDF co-doped with the elements P and Al.

The broad-band light source 2 operates as follows. A pumping lightwave outputted from the pumping light source 14a is bifurcated by the optical coupler 15. One of the bifurcated pumping lightwaves is supplied to the EDF 11a via the optical coupler 12a. The other is supplied to the EDF 11a via the optical coupler 12b. A pumping lightwave outputted from the pumping light source 14c is supplied to the EDFs 11c and 11b via the optical coupler 12c. The EDFs 11a, 11b, and 11c supplied with the pumping lightwaves generate an ASE lightwave.

Of the ASE lightwaves generated in the EDF 11a, the ASE lightwave heading for the optical coupler 12b passes through it and is blocked by the optical isolator 13b. On the other hand, of the ASE lightwaves generated in the EDF 11a, the ASE lightwave heading for the optical coupler 12a passes through it and the optical isolator 13a in this order and enters the first input port $16_1$ of the optical coupler 16.

Of the ASE lightwaves generated in the EDFs 11b and 11c, the ASE lightwave heading for the optical isolator 13b passes through it and the optical coupler 12b in this order and enters the EDF 11a. Then, the ASE lightwave is amplified there, passes through the optical coupler 12a and the optical isolator 13a in this order, and enters the first input port $16_1$ of the optical coupler 16. On the other hand, of the ASE lightwaves generated in the EDFs 11b and 11c, the ASE lightwave heading for the optical coupler 12c passes through it and the optical isolator 13c in this order and enters the second input port $16_2$ of the optical coupler 16.

The ASE lightwave that is outputted from the first end of the optical waveguide and that enters the first input port $16_1$ of the optical coupler 16 has an intensity peak in the L-band. The ASE lightwave that is outputted from the second end of the optical waveguide and that enters the second input port $16_2$ of the optical coupler 16 has an intensity peak in the C-band. The ASE lightwave in the L-band and the ASE lightwave in the C-band are combined in accordance with the transmission property shown in FIG. 2. The resultant ASE lightwave is outputted from the output port $16_3$ of the optical coupler 16 and is finally outputted from the optical connector 18 to the outside.

The broad-band light source 2 has no reflector. In other words, it has no resonator structure. As a result, it has a reduced tendency to oscillate. In addition, the broad-band light source 2 combines the ASE lightwaves having arrived at both ends of the optical waveguide by the optical coupler 16 to output the resultant ASE lightwave. Therefore, it has high efficiency. In this case, the intensity spectrum of the lightwave to be outputted from the broad-band light source can be flattened.

In particular, in contrast to the case of the second embodiment, the broad-band light source 2 of the third embodiment comprises the cascade-connected EDFs 11b and 11c, which have different compositions with each other. This structure can output from the optical connector 18 a lightwave having a reduced deviation in the intensity throughout the C- and L-bands.

Figure 4:
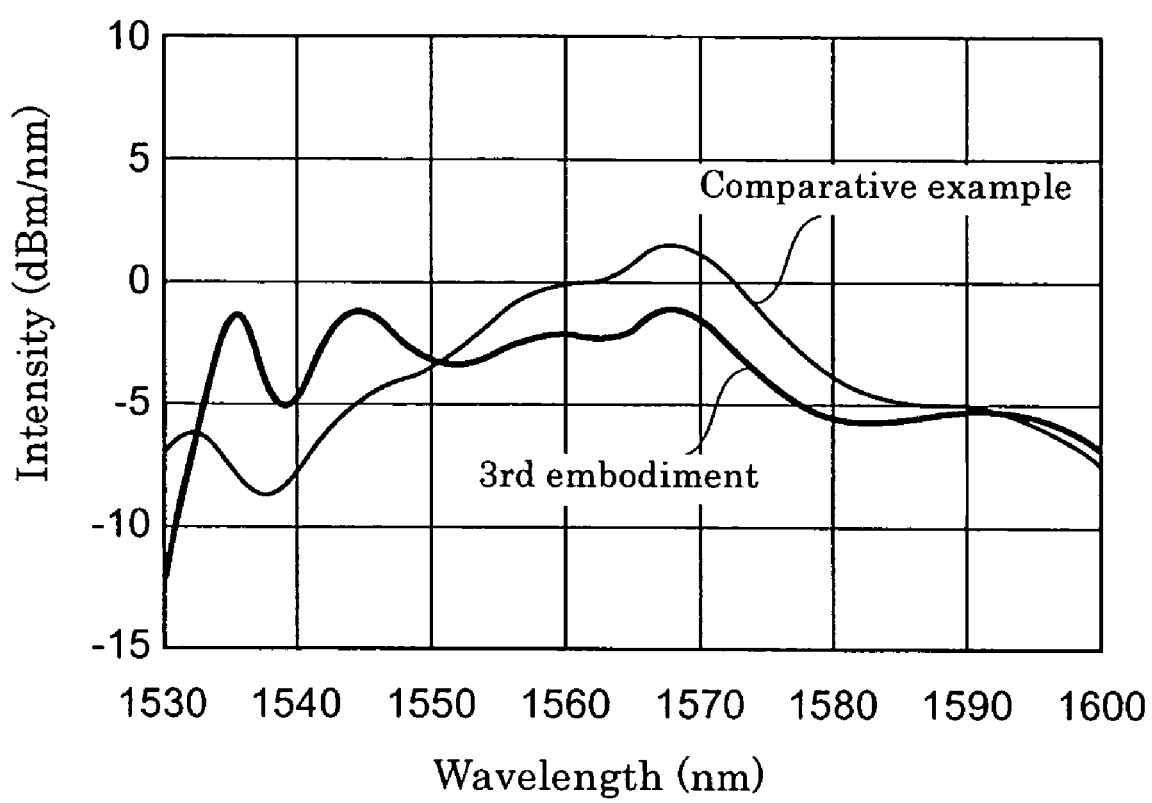
FIG. 4 is a graph showing an intensity spectrum of the lightwave outputted from the broad-band light source 2.
Figure 11:
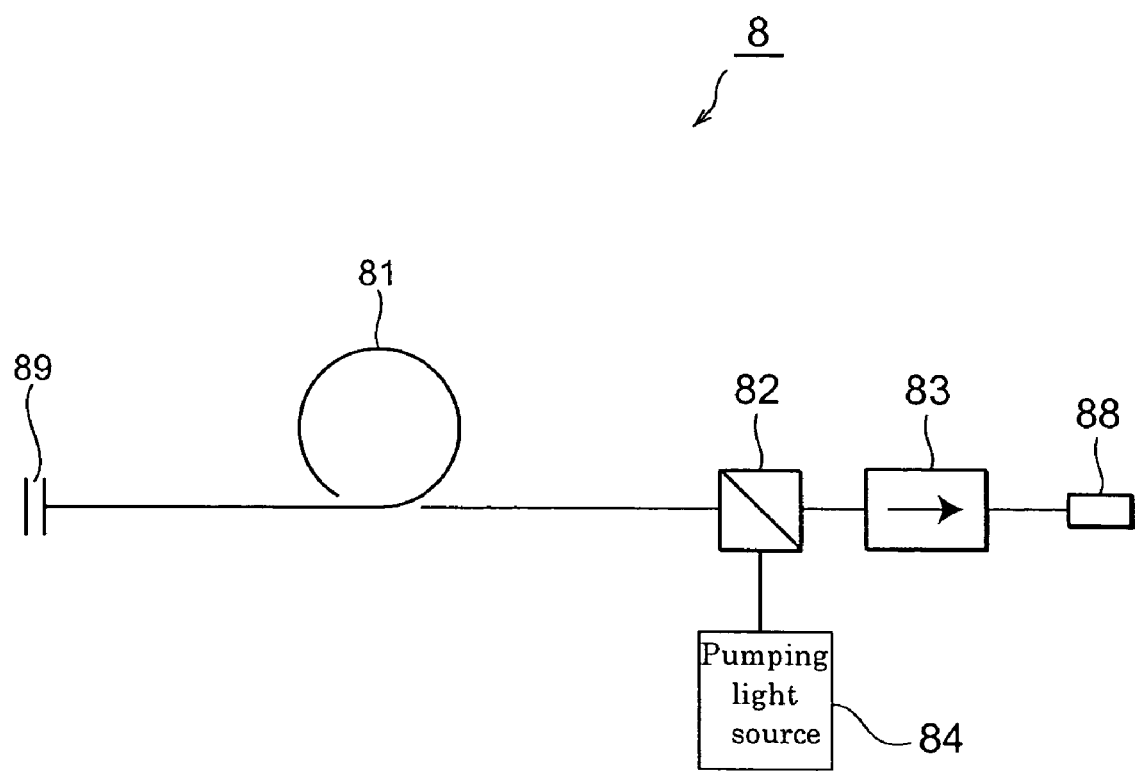
FIG. 11 is a schematic diagram showing a conventional broad-band light source 8.
Figure 12:
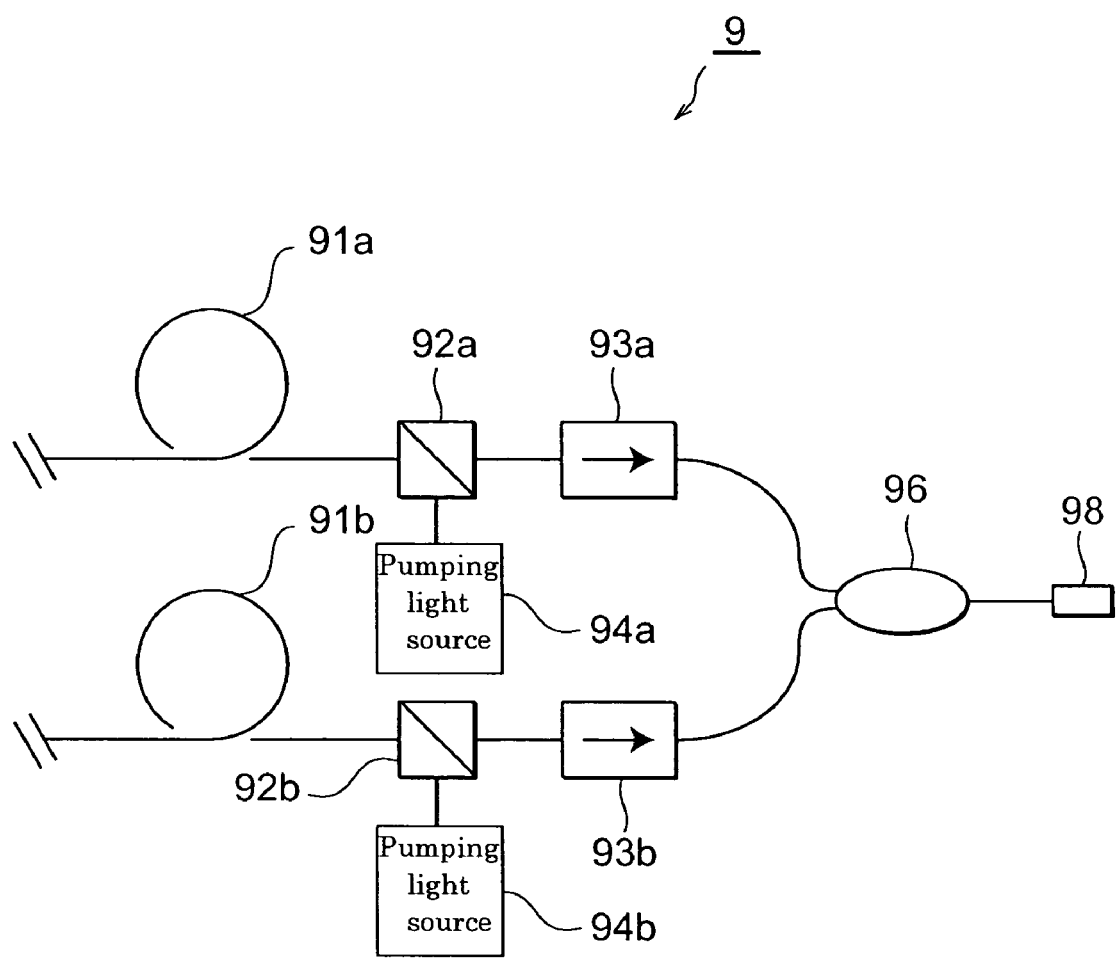
FIG. 12 is a schematic diagram showing a broad-band light source 9.

FIG. 4 is a graph showing an intensity spectrum of the lightwave outputted from the broad-band light source 2. The graph is obtained under the following conditions:

Wavelength of the pumping lightwave: 1.48 μm
Intensity of the pumping lightwave to be outputted from the pumping light source 14a: 90 mW
Intensity of the pumping lightwave to be outputted from the pumping light source 14c: 86 mW
Total intensity of the pumping lightwaves: 176 mW. FIG. 4 also shows an intensity spectrum of the lightwave outputted from a broad-band light source of Comparative example, which has a structure shown in FIG. 11. In this case, the intensity of the pumping lightwave is 130 mW.

As can be seen from FIG. 4, in Comparative example, the output lightwave has a positive spectrum gradient in the C-band, and the intensity deviation is about 10 dB in the C-band. The output lightwave has an intensity density of −7 dBm/nm or more in a wavelength band of 1,540 to 1,600 nm.

On the other hand, in the broad-band light source 2 of the third embodiment, the EDF 11c, which is co-doped with the element P, is placed between the EDF 11b and the optical coupler 16. This arrangement can increase the population inversion in the EDF 11c. Thus, the EDF 11c can have a negative spectrum gradient in the C-band. As a result, the lightwave outputted from the connector 18 has a small intensity deviation in the C-band. Finally, the output lightwave has a small intensity deviation throughout the C- and L-bands. The output lightwave has an intensity density of −5.7 dBm/nm or more in a wavelength band of 1,532.6 to 1,595.8 nm. It has an intensity deviation of about 5.2 dB. This band width of 63.2 nm is broader than that of Comparative example.

To achieve a negative spectrum gradient in the C-band, the EDF 11c needs only to be co-doped with the element P. Nevertheless, to achieve high pumping efficiency, it is desirable to further co-dope a dopant that can reduce the concentration quenching, such as trivalent ions of the element Al or La, or the like.

(The Fourth Embodiment)

Figure 5:
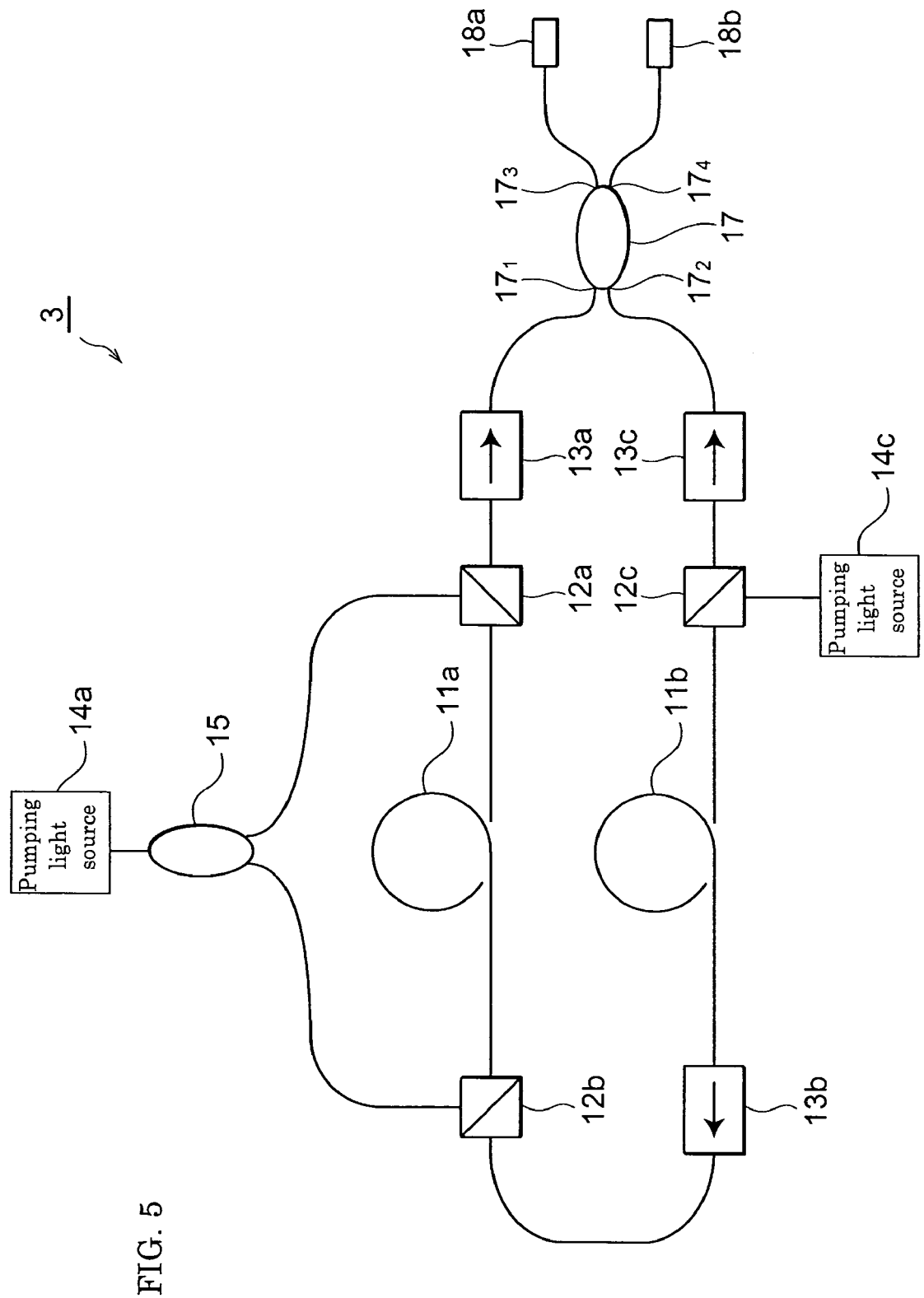
FIG. 5 is a schematic diagram showing a broad-band light source 3 of the fourth embodiment of the present invention.

Next, the fourth embodiment of the broad-band light source of the present invention is explained below. FIG. 5 is a schematic diagram showing a broad-band light source 3 of the fourth embodiment. The broad-band light source 3 shown in FIG. 5 differs from the broad-band light source 1 of the second embodiment shown in FIG. 1 in that it replaces the optical coupler 16 and the optical connector 18 with an optical coupler 17 and optical connectors 18a and 18b.

In the broad-band light source 3, the lightwave-combining means (optical coupler 17) is a 2×2 coupler that has two input ports $17_1$ and $17_2$ and two output ports $17_3$ and $17_4$. It has a specific branching ratio (in this case, 3 dB). The input port $17_1$ is connected to the first end of the optical waveguide, and the other input port $17_2$ is connected to the second end of the optical waveguide.

The optical connector 18a outputs to the outside an ASE lightwave outputted from the first output port $17_3$ of the optical coupler 17. The optical connector 18b outputs to the outside an ASE lightwave outputted from the second output port $17_4$ of the optical coupler 17. Because the optical coupler 17 has a branching ratio of 3 dB, the lightwaves outputted from the two optical connectors 18a and 18b have the same spectrum, which is a desirable feature.

In the broad-band light source 3, the ASE lightwave in the L-band outputted from the first end of the optical waveguide enters the first input port $17_1$ of the optical coupler 17. The ASE lightwave in the C-band outputted from the second end of the optical waveguide enters the second input port $17_2$ of the optical coupler 17. Each of the ASE lightwave in the L-band and the ASE lightwave in the C-band is bifurcated by the optical coupler 17. One of the bifurcated ASE lightwaves in the L-band and one of the bifurcated ASE lightwaves in the C-band are outputted from the first output port $17_3$ of the optical coupler 17. Then, they are outputted from the optical connector 18a to the outside. The other of the bifurcated ASE lightwaves in the L-band and the other of the bifurcated ASE lightwaves in the C-band are outputted from the second output port $17_4$ of the optical coupler 17. Then, they are outputted from the optical connector 18b to the outside.

The broad-band light source 3 has no reflector. In other words, it has no resonator structure. As a result, it has a reduced tendency to oscillate. In addition, the broad-band light source 3 combines the ASE lightwaves having arrived at both ends of the optical waveguide by the optical coupler 17 to output the resultant ASE lightwave. Therefore, it has high efficiency.

In particular, in contrast to the case of the second embodiment, in the broad-band light source 3 of the fourth embodiment, when the losses in the optical coupler 17 and the optical connectors 18a and 18b are neglected, the total intensity of the ASE lightwaves outputted from the optical connectors 18a and 18b is equal to the total intensity of the ASE lightwaves inputted into the first input port $17_1$ and the second input port $17_2$ of the optical coupler 17. Consequently, the efficiency can be further increased.

Figure 6:
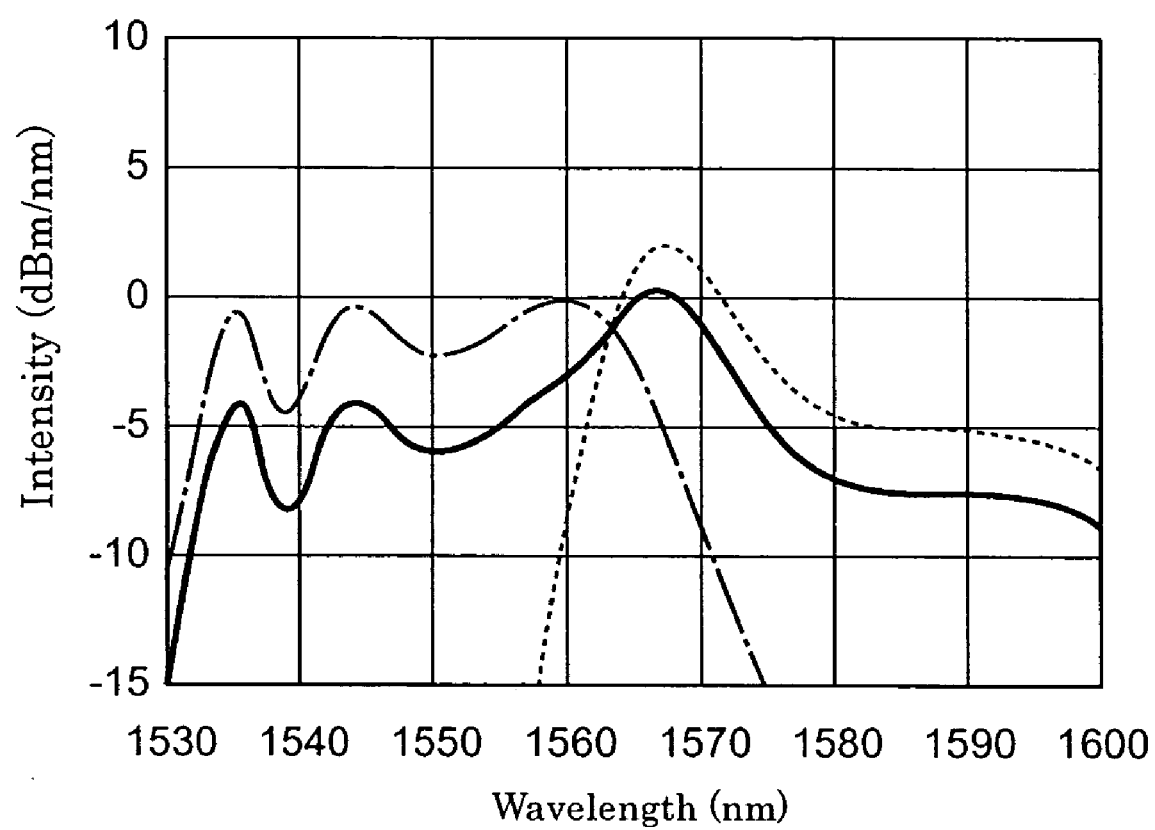
FIG. 6 is a graph showing an intensity spectrum of the lightwave outputted from one of the optical connectors of the broad-band light source 3.

FIG. 6 is a graph showing an intensity spectrum of the lightwave outputted from one of the optical connectors of the broad-band light source 3. In FIG. 6, a solid line shows the intensity spectrum of the lightwave outputted from the optical connector 18a (or 18b), a broken line shows that of the lightwave inputted into the first input port $17_1$ of the optical coupler 17, and alternate long and short dashed lines show that of the lightwave inputted into the second input port $17_2$ of the optical coupler 17.

As can be seen from FIG. 6, the intensity spectrum of the lightwave inputted into the first input port $17_1$ of the optical coupler 17 (broken line) has a peak in the L-band. The intensity spectrum of the lightwave inputted into the second input port $17_2$ of the optical coupler 17 (alternate long and short dashed lines) has a peak in the C-band. The intensity spectrum of the lightwave outputted from the optical connector 18a (or 18b) (solid line) lies over the C- and L-bands.

Under the following conditions, the broad-band light source 2 of the third embodiment outputs the lightwave having an intensity of +15.3 dBm:

Wavelength of the pumping lightwave: 1.48 μm
Intensity of the pumping lightwave to be outputted from the pumping light source 14a: 90 mW
Intensity of the pumping lightwave to be outputted from the pumping light source 14c: 86 mW.

In contrast, under the same condition as above, the broad-band light source 3 of the fourth embodiment outputs the lightwaves whose total intensity is +16.8 dBm, which is larger than the foregoing value of +15.3 dBm by 1.5 dB. The broad-band light source 3 has an intensity deviation of about 8 dB in a wavelength band of 1,532.6 to 1,595.8 nm.

Figure 7:
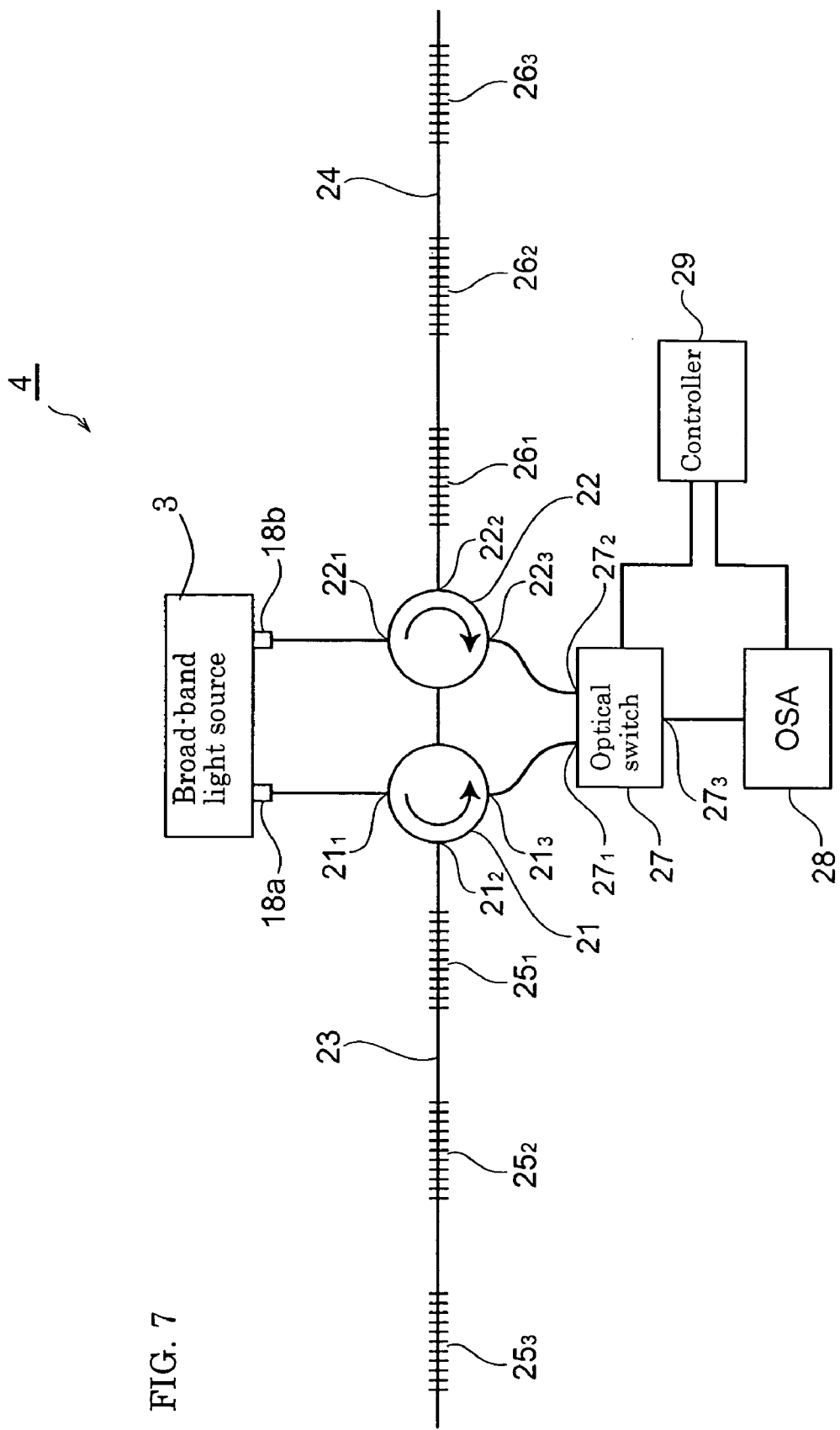
FIG. 7 is a schematic diagram showing an optical measuring system 4 using the broad-band light source 3.

FIG. 7 is a schematic diagram showing an optical measuring system 4 using the broad-band light source 3. The optical measuring system 4 shown in FIG. 7 comprises the broad-band light source 3, optical circulators 21 and 22, optical fibers 23 and 24, an optical switch 27, an optical spectrum analyzer 28, and a controller 29.

The optical circulator 21 is provided with a first port $21_1$, a second port $21_2$, and a third port $21_3$. The first port $21_1$ is connected to the output connector 18a of the broad-band light source 3. The optical circulator 21 outputs from the second port $21_2$ the lightwave having entered the first port $21_1$ and outputs from the third port $21_3$ the lightwave having entered the second port $21_2$. Similarly, the optical circulator 22 is provided with a first port $22_1$, a second port $22_2$, and a third port $22_3$. The first port $22_1$ is connected to the output connector 18b of the broad-band light source 3. The optical circulator 22 outputs from the second port $22_2$ the lightwave having entered the first port $22_1$ and outputs from the third port $22_3$ the lightwave having entered the second port $22_2$.

The optical fiber 23 is connected to the second port $21_2$ of the optical circulator 21 through its one end. Gratings $25_1$, $25_2$, and $25_3$ are formed from that end in this order with specific intervals. Similarly, the optical fiber 24 is connected to the second port $22_2$ of the optical circulator 22 through its one end. Gratings $26_1$, $26_2$, and $26_3$ are formed from that end in this order with specific intervals.

Each of the gratings $25_1$ to $25_3$ and the gratings $26_1$ to $26_3$ is the Bragg type and can Bragg-reflect a lightwave having one of the wavelengths of the broad-band lightwave outputted from the broad-band light source 3 (the wavelength of the lightwave reflected is referred to as "reflection wavelength"). The reflection wavelength at each of the gratings $25_1$ to $25_3$ is different from one another. The reflection wavelength at each of the gratings $26_1$ to $26_3$ is different from one another. The reflection wavelength at each of the gratings $25_1$ to $25_3$ and the gratings $26_1$ to $26_3$ depends on the tension or temperature to which the grating is subjected.

The optical switch 27 is provided with a first input port $27_1$, a second input port $27_2$, and an output port $27_3$. The first input port $27_1$ is connected to the third port $21_3$ of the optical circulator 21. The second input port $27_2$ is connected to the third port $22_3$ of the optical circulator 22. The optical switch 27 optically connects between the first input port $27_1$ and the output port $27_3$ or between the second input port $27_2$ and the output port $27_3$ selectively.

The optical spectrum analyzer 28 receives the lightwave outputted from the output port $27_3$ of the optical switch 27 to analyze the intensity spectrum of the received lightwave. The controller 29 controls the operation of the optical switch 27 and the optical spectrum analyzer 28.

The optical measuring system 4 is used, for example, to measure the water level at various points of a river as explained below. A set of the broad-band light source 3, the optical circulators 21 and 22, the optical switch 27, the optical spectrum analyzer 28, and the controller 29 is placed at a predetermined position along the stream of a river. The optical fiber 23 is laid toward the upstream from there, and the optical fiber 24 is laid toward the downstream from there. Each of the gratings $25_1$ to $25_3$ and the gratings $26_1$ to $26_3$ is subjected to the tension or temperature in accordance with the water level at the point where the grating is placed. The optical measuring system 4 operates as follows.

The broad-band lightwave outputted from the optical connector 18a, one of the two optical connectors, of the broad-band light source 3 enters the first port $21_1$ of the optical circulator 21, is outputted from the second port $21_2$, and travels over the optical fiber 23 toward the upstream of the river. Of the broad-band lightwave traveling over the optical fiber 23 toward the upstream, the lightwave Bragg-reflected by each of the gratings $25_1$ to $25_3$ travels over the optical fiber 23 in the opposite direction, enters the second port $21_2$ of the optical circulator 21, is outputted from the third port $21_3$, and enters the first input port $27_1$ of the optical switch 27.

Similarly, the broad-band lightwave outputted from the other optical connector 18b passes through the optical circulator 22 and travels over the optical fiber 24 toward the downstream of the river. The lightwave reflected by each of the gratings $26_1$ to $26_3$ travels over the optical fiber 24 in the opposite direction, passes through the optical circulator 22, and enters the second input port $27_2$ of the optical switch 27.

The lightwaves having entered the first input port $27_1$ and the second input port $27_2$ of the optical switch 27 are alternately outputted from the output port $27_3$ of the optical switch 27 to enter the optical spectrum analyzer 28. The spectrum of the lightwave having entered the optical spectrum analyzer 28 is analyzed by it. Based on the analyzed result, the reflection wavelength at each of the gratings $25_1$ to $25_3$ and the gratings $26_1$ to $26_3$ is obtained. Accordingly, the water level at the placed position of each grating is obtained.

The optical measuring system 4 can be used not only to measure the water level at various points of a river but also to measure the strain generated in a building, for example.

In the optical measuring system 4, the minimum optical intensity the optical spectrum analyzer 28 can detect is denoted as $P_r$ (dBm), the total intensity of the lightwaves outputted from the broad-band light source 3 is denoted as $P_t$ (dBm), and the transmission loss of both of the optical fibers 23 and 24 is denoted as $\alpha$ (dB/km).

When a lightwave having an intensity of $P_t$ is outputted from a single optical connector of a broad-band light source and travels over a single optical fiber, the distance $L_1$ (km) of a section whose water level can be measured by using an optical measuring system is expressed by the equation $$L_1=(P_t-P_r)/(2\alpha) \qquad (1).$$

In the case of the optical measuring system 4 using the broad-band light source 3 of the fourth embodiment, a lightwave with an intensity of $(P_t-3)$ (dB) outputted from the optical connector 18a, one of the two optical connectors, travels over the optical fiber 23 toward the upstream of the river. Similarly, a lightwave with an intensity of $(P_t-3)$ (dB) outputted from the other optical connector 18b travels over the optical fiber 24 toward the downstream of the river. Therefore, the distance $L_2$ (km) of a section whose water level can be measured by using the optical measuring system 4 is expressed by the equation $$L_2=2(P_t-3-P_r)/(2\alpha) \qquad (2).$$

Consequently, when the loss budget $(P_t-P_r)$ is greater than 6 dB, the distance $L_2$ is longer than the distance $L_1$. In other words, it is advantageous to use the broad-band light source 3, which has two outputs. For example, when the loss budget is 20 dB and the transmission loss $\alpha$ of both of the optical fibers 23 and 24 is 0.5 dB/km, the distance $L_2$ is 34 km in contrast to the distance $L_1$ of 20 km. In other words, the distance $L_2$ is 1.7 times the distance $L_1$.

In the optical measuring system 4, the optical switch 27 may be replaced with an optical fiber coupler or interleaver having a narrow Free Spectral Range (FSR) when the individual reflection wavelengths of the gratings $25_1$ to $25_3$ and the individual reflection wavelengths of the gratings $26_1$ to $26_3$ are alternately assigned at constant intervals. The optical switch 27 may also be replaced with an optical multiplexer that combines the lightwaves outputted from the third port $21_3$ of the optical circulator 21 and the third port $22_3$ of the optical circulator 22 when the individual reflection wavelengths of the gratings $25_1$ to $25_3$ are assigned to be longer than a specific wavelength and the individual reflection wavelengths of the gratings $26_1$ to $26_3$ are assigned to be shorter than a specific wavelength. In these cases, the optical spectrum analyzer 28 can simultaneously measure the individual reflection wavelengths of the gratings $25_1$ to $25_3$ and the gratings $26_1$ to $26_3$.

(The Fifth Embodiment)

Figure 8:
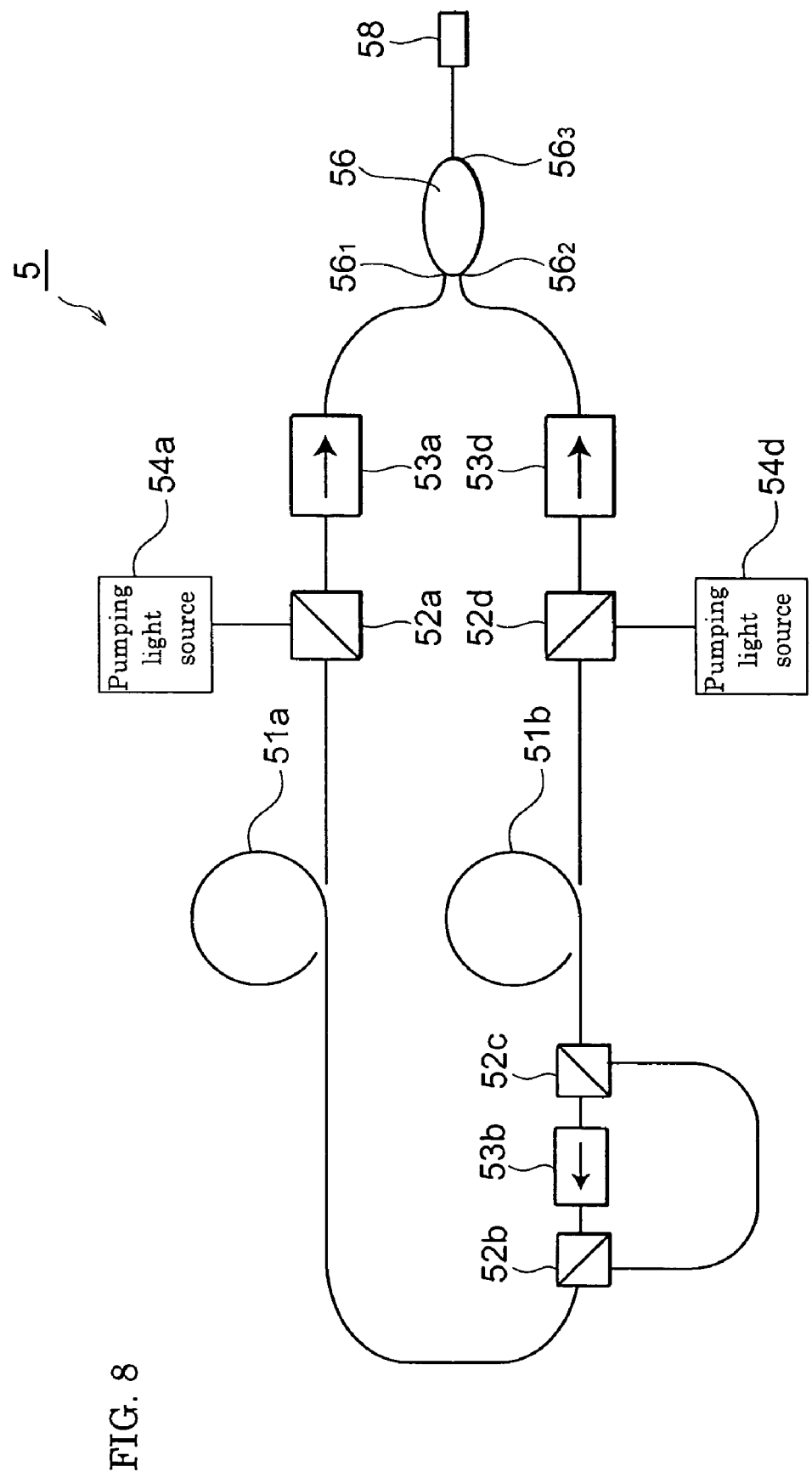
FIG. 8 is a schematic diagram showing a broad-band light source 5 of the fifth embodiment of the present invention.

Next, the fifth embodiment of the broad-band light source of the present invention is explained below. FIG. 8 is a schematic diagram showing a broad-band light source 5 of the fifth embodiment. In the broad-band light source 5 shown in FIG. 8, an optical waveguide is structured between a first input port $56_1$ and a second input port $56_2$ of the optical coupler 56. A first end of the optical waveguide is connected to the first input port $56_1$ of the optical coupler 56, and a second end of it is connected to the second input port $56_2$ of the optical coupler 56.

The broad-band light source 5 comprises an optical isolator 53a, an optical coupler 52a, a thulium-doped fiber (TDF) 51a, an optical coupler 52b, an optical isolator 53b, an optical coupler 52c, a TDF 51b, an optical coupler 52d, and an optical isolator 53d from the first end toward the second end in this order on the optical waveguide. The broad-band light source 5 further comprises (a) a pumping light source 54a connected to the optical coupler 52a, (b) a pumping light source 54d connected to the optical coupler 52d, and (c) an optical connector 58 connected to an output port $56_3$ of the optical coupler 56.

The TDFs 51a and 51b are an optical fiber that uses fluoride-based glass or telluride-based glass as the host glass and that is doped with the element thulium (Tm) in the core region. They are used as an optical active element that generates an ASE lightwave when a pumping lightwave is supplied. A TDF has a gain peak in the vicinity of a wavelength of 1.47 μm when the population inversion is high and has a gain peak in the vicinity of a wavelength of 1.49 μm when the population inversion is low.

The optical coupler 52a can both output an ASE lightwave having arrived from the TDF 51a to the optical isolator 53a and output a pumping lightwave having arrived from the pumping light source 54a to the TDF 51a. The optical coupler 52b can both output an ASE lightwave having arrived from the TDF 51a to the optical isolator 53b and output a pumping lightwave having arrived from the TDF 51a to the optical coupler 52c. The optical coupler 52b also can both output an ASE lightwave having arrived from the optical isolator 53b to the TDF 51a and output a pumping lightwave having arrived from the optical coupler 52c to the TDF 51a. The optical coupler 52c can output a pumping lightwave having arrived from the optical coupler 52b to the TDF 51b. The optical coupler 52c also can both output an ASE lightwave having arrived from the TDF 51b to the optical isolator 53b and output a pumping lightwave having arrived from the TDF 51b to the optical coupler 52b. The optical coupler 52d can both output an ASE lightwave having arrived from the TDF 51b to the optical isolator 53d and output a pumping lightwave having arrived from the pumping light source 54d to the TDF 51b.

The optical isolator 53a transmits a lightwave in a direction from the optical coupler 52a to the optical coupler 56, but it does not transmit a lightwave in the opposite direction. The optical isolator 53d transmits a lightwave in a direction from the optical coupler 52d to the optical coupler 56, but it does not transmit a lightwave in the opposite direction.

The pumping light source 54a outputs a pumping lightwave to the optical coupler 52a. The pumping light source 54d outputs a pumping lightwave to the optical coupler 52d. It is desirable to use a laser diode as the pumping light sources 54a and 54d. The combination of the pumping light source 54a and the optical coupler 52a acts as a pumping lightwave-supplying means that supplies a pumping lightwave to the TDF 51a, a optical active element. The combination of the pumping light source 54d and the optical coupler 52d acts as a pumping lightwave-supplying means that supplies a pumping lightwave to the TDF 51b, a optical active element.

The ASE lightwave outputted from the first end of the optical waveguide enters the first input port $56_1$ of the optical coupler 56. The ASE lightwave outputted from the second end of the optical waveguide enters the second input port $56_2$ of the optical coupler 56. The optical coupler 56 combines them and outputs the resultant ASE lightwave from the output port $56_3$. The optical connector 58 outputs to the outside the ASE lightwave having arrived from the output port $56_3$ of the optical coupler 56.

In the fifth embodiment, the TDF 51a is doped with the element Tm at a concentration as relatively high as 6,000 wt. ppm or so, and the TDF 51d is doped with the element Tm at a concentration as relatively low as 2,000 wt. ppm or so. The pumping light sources 54a and 54d output a pumping lightwave in a 1.05-μm wavelength band. Consequently, the TDF 51a having a high concentration of the doped Tm has a low population inversion due to the concentration quenching. As a result, it has a gain peak in the vicinity of a wavelength of 1.49 μm. On the other hand, the TDF 51d having a low concentration of the doped Tm has a high population inversion and consequently has a gain peak in the vicinity of a wavelength of 1.47 μm.

The broad-band light source 5 operates as follows. A pumping lightwave outputted from the pumping light source 54a is supplied to the TDF 51a via the optical coupler 52a. A pumping lightwave outputted from the pumping light source 54d is supplied to the TDF 51b via the optical coupler 52d. The TDFs 51a and 51b supplied with the pumping lightwaves generate an ASE lightwave.

Of the ASE lightwaves generated in the TDF 51a, the ASE lightwave heading for the optical coupler 52b passes through it and is blocked by the optical isolator 53b. On the other hand, of the ASE lightwaves generated in the TDF 51a, the ASE lightwave heading for the optical coupler 52a passes through it and the optical isolator 53a in this order and enters the first input port $56_1$ of the optical coupler 56.

Of the ASE lightwaves generated in the TDF 51b, the ASE lightwave heading for the optical coupler 52c passes through it, the optical isolator 53b, and the optical coupler 52b in this order and enters the TDF 51a. Then, the ASE lightwave is amplified there, passes through the optical coupler 52a and the optical isolator 53a in this order, and enters the first input port $56_1$ of the optical coupler 56. On the other hand, of the ASE lightwaves generated in the TDF 51b, the ASE lightwave heading for the optical coupler 52d passes through it and the optical isolator 53d in this order and enters the second input port 562 of the optical coupler 56.

The ASE lightwave that is outputted from the first end of the optical wave guide and that enters the first input port $56_1$ of the optical coupler 56 has an intensity peak in the vicinity of a wavelength of 1.49 μm. The ASE lightwave that is outputted from the second end of the optical waveguide and that enters the second input port $56_2$ of the optical coupler 56 has an intensity peak in the vicinity of a wavelength of 1.47 μm. Both ASE lightwaves are combined in accordance with the specific transmission property. The resultant ASE lightwave is outputted from the output port $56_3$ of the optical coupler 56 and is finally outputted from the optical connector 58 to the outside.

The broad-band light source 5 has no reflector. In other words, it has no resonator structure. As a result, it has a reduced tendency to oscillate. In addition, the broad-band light source 5 combines the ASE lightwaves having arrived at both ends of the optical waveguide by the optical coupler 56 to output the resultant ASE lightwave. Therefore, it has high efficiency.

In the broad-band light source 5, the optical isolator 53b is placed at an intermediate position of the optical waveguide. As a result, the difference in the band between the ASE lightwaves outputted from the first and second ends of the optical waveguide can be increased. It is desirable that the optical isolator 53b be placed at a position other than the middle point of the optical waveguide.

As described above, the broad-band light source 5 uses the optical coupler 56 that has two input ports $56_1$ and $56_2$ and one output port $56_3$. The transmission property from the first input port $56_1$ to the output port $56_3$ and the transmission property from the second input port $56_2$ to the output port $56_3$ are properly predetermined. Consequently, the intensity peak in the vicinity of the band boundary of the lightwave inputted into each of the two input ports $56_1$ and $56_2$ is suppressed. Under this condition, the resultant lightwave is outputted from the output port $56_3$.

In addition, in the structure shown in FIG. 8, the following design may be employed. The TDFs 51a and 51b are doped with the element Tm at low concentration. The pumping light sources 54a and 54d output a pumping lightwave in a wavelength band different from each other (a 1.05-μm band, a 1.2-μm band, a 1.4-μm band, or a 1.55 to 1.65-μm band). In this case, also, the broad-band light source 5 can achieve an effect similar to that described above.

(The Sixth Embodiment)

Figure 9:
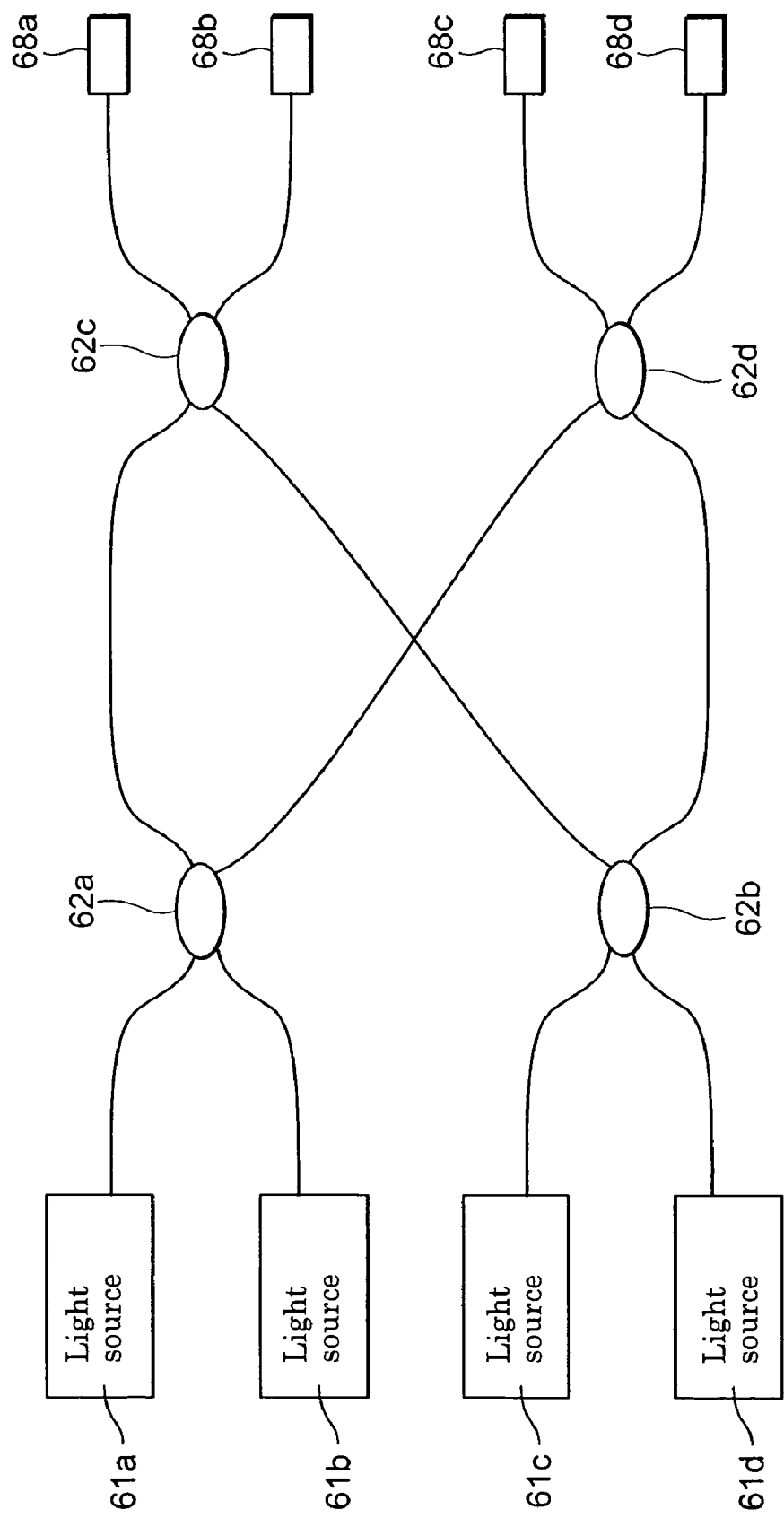
FIG. 9 is a schematic diagram showing a broad-band light source 6 of the sixth embodiment of the present invention.

Next, the sixth embodiment of the broad-band light source of the present invention is explained below. FIG. 9 is a schematic diagram showing a broad-band light source 6 of the sixth embodiment. The broad-band light source 6 comprises:

(a) light sources 61a, 61b, 61c, and 61d that output lightwaves having a different spectrum from one another;

(b) a lightwave-combining means that comprises optical couplers 62a, 62b, 62c, and 62d and that combines lightwaves outputted from the light sources 61a to 61d to output the resultant lightwave from four output ports; and (c) optical connectors 68a, 68b, 68c, and 68d.

The four light sources 61a, 61b, 61c, and 61d output lightwaves having a different spectrum from one another. The light source 61a is an ASE light source that outputs an ASE lightwave having an intensity peak in the vicinity of a wavelength of 1.47 μm. The light source 61b is an ASE light source that outputs an ASE lightwave having an intensity peak in the vicinity of a wavelength of 1.49 μm. The light source 61c is an ASE light source that outputs an ASE lightwave having an intensity peak in the C-band. The light source 61d is an ASE light source that outputs an ASE lightwave having an intensity peak in the L-band.

The optical couplers 62a, 62b, 62c, and 62d are a 2×2 coupler that has two input ports and two output ports and that has a specific branching ratio. They constitute as a whole a 4×4 coupler that combines the ASE lightwaves outputted from the four light sources 61a, 61b, 61c, and 61d to output the resultant ASE lightwave from the four output ports.

The optical coupler 62a receives the ASE lightwave outputted from the light source 61a at one of the two input ports, receives the ASE lightwave outputted from the light source 61b at the other input port, and combines them. Then, the resultant ASE lightwave is bifurcated. The bifurcated ASE lightwaves are outputted from the two output ports. The optical coupler 62b receives the ASE lightwave outputted from the light source 61c at one of the two input ports, receives the ASE lightwave outputted from the light source 61d at the other input port, and combines them. Then, the resultant ASE lightwave is bifurcated. The bifurcated ASE lightwaves are outputted from the two output ports.

The optical coupler 62c receives the ASE lightwave outputted from one of the two output ports of the optical coupler 62a at one of the two input ports, receives the ASE lightwave outputted from one of the two output ports of the optical coupler 62b at the other input port, and combines them. Then, the resultant ASE lightwave is bifurcated. The bifurcated ASE lightwaves are outputted from the two output ports. The optical coupler 62d receives the ASE lightwave outputted from the other output port of the optical coupler 62a at one of the two input ports, receives the ASE lightwave outputted from the other output port of the optical coupler 62b at the other input port, and combines them. Then, the resultant ASE lightwave is bifurcated. The bifurcated ASE lightwaves are outputted from the two output ports.

The optical connector 68a outputs to the outside the ASE lightwave outputted from one of the two output ports of the optical coupler 62c. The optical connector 68b outputs to the outside the ASE lightwave outputted from the other output port of the optical coupler 62c. The optical connector 68c outputs to the outside the ASE lightwave outputted from one of the two output ports of the optical coupler 62d. The optical connector 68d outputs to the outside the ASE lightwave outputted from the other output port of the optical coupler 62d.

It is desirable that the optical couplers 62a, 62b, 62c, and 62d have no frequency dependence of the optical transmission property from the input port to the output port. In this case, the lightwaves outputted from the optical connectors 68a, 68b, 68c, and 68d have a power spectrum that is comparable to one another and that lies over a broad band including the S-band (1,460 to 1,530 nm), C-band, and L-band.

The broad-band light source 6 operates as follows. An ASE lightwave having an intensity peak in the vicinity of a wavelength of 1.47 μm outputted from the light source 61a is bifurcated by the optical coupler 62a. The bifurcated ASE lightwaves are further bifurcated by the optical couplers 62c and 62d. In other words, the original ASE lightwave is tetra-furcated as a whole to output the tetra-furcated ASE lightwaves from the optical connectors 68a, 68b, 68c, and 68d. Similarly, each of the ASE lightwaves outputted from the light sources 61b, 61c, and 61d is tetra-furcated as a whole to output the tetra-furcated ASE lightwaves from the optical connectors 68a, 68b, 68c, and 68d.

Figure 10A:
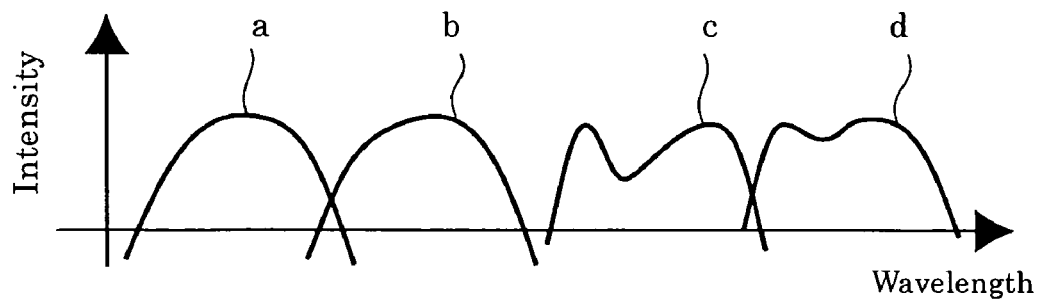
FIGS. 10A to 10D are graphs showing optical power spectra at various points of the broad-band light source 6.
Figure 10B:
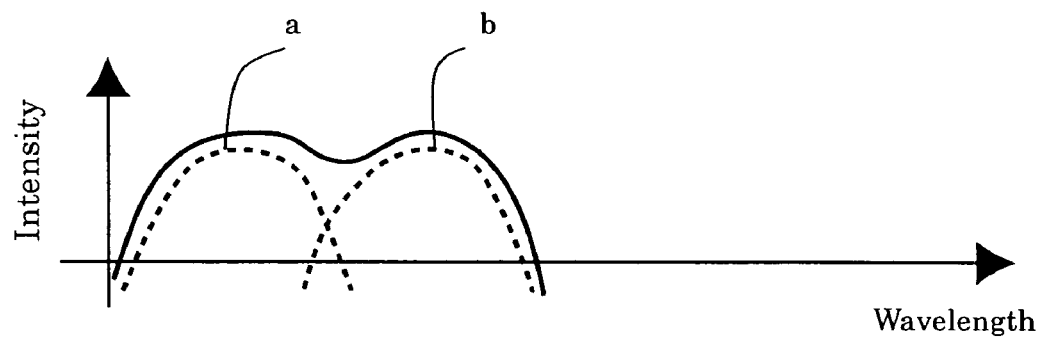
Figure 10C:
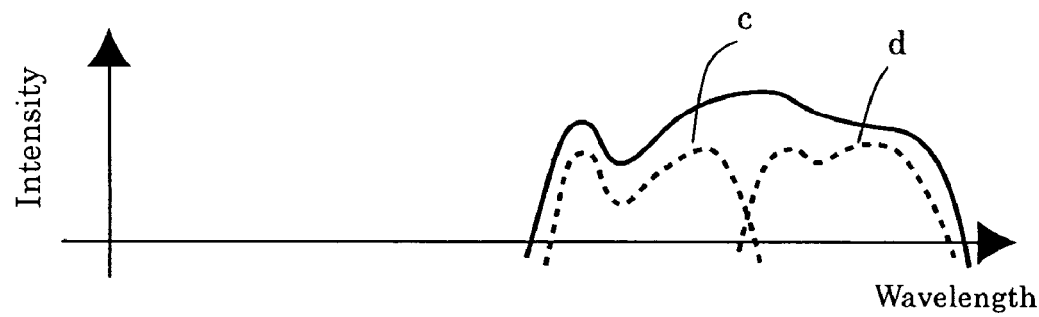
Figure 10D:
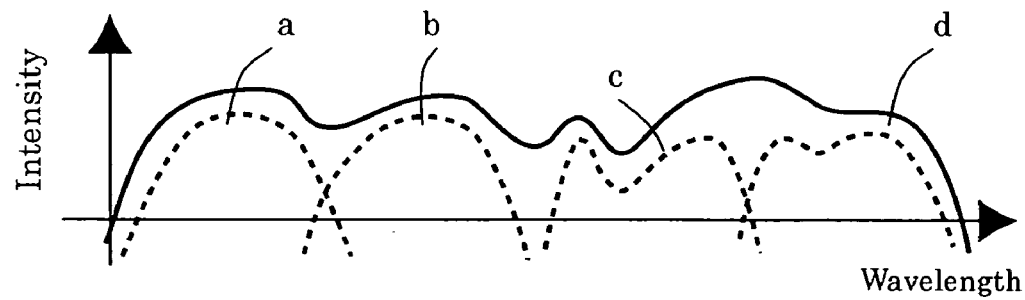

FIGS. 10A to 10D are graphs showing optical power spectra at various points of the broad-band light source 6. In FIG. 10A, the curves a, h, c, and d show the power spectrum of the lightwave outputted from the light sources 61a, 61b, 61c, and 61d, respectively. In FIG. 10B, a solid line shows the power spectrum of the lightwave outputted from the optical coupler 62a. In FIG. 10C, a solid line shows the power spectrum of the lightwave outputted from the optical coupler 62b. In FIG. 10D, a solid line shows the power spectrum of the lightwave outputted from each of the optical connectors 68a, 68b, 68c, and 68d. As described above, the lightwave outputted from each of the optical connectors 68a, 68b, 68c, and 68d lies over a broad band including the S-, C-, and L-bands.

In the sixth embodiment, the broad-band light source 6 comprising four light sources and a 4×4 coupler is explained. However, the broad-band light source may comprise N light sources and an N×M coupler. It is desirable that the lightwave-combining means incorporated in the broad-band light source have a minimized frequency dependence.

MODIFIED EXAMPLES

The present invention is not limited to the above-described embodiments. It can have various modifications. For example, the above-described embodiments use an EDF or TDF as the optical active element. However, the optical active element is not limited to them. Other optical fibers may be used when they contain a constituent capable of producing a different form of fluorescence spectrum due to the difference in population inversion, such as a rare earth element or a transition metal element.

The host material of the optical active element is not limited to the silica glass. Another type of glass, a crystal, a ceramic material, or the like may be used. The optical active element using a crystal or ceramic material as the host material has a notable peak of fluorescence and absorption and therefore has a considerable unevenness in the gain spectrum. However, it can emit a fluorescence over a broad band. Therefore, it is suitable for the broad-band light source to be used in an optical measuring system as shown in FIG. 7.

The optical active element may be either an optical fiber or an optical waveguide formed on a flat substrate.

The present invention is described above in connection with what is presently considered to be the most practical and preferred embodiments. However, the invention is not limited to the disclosed embodiments, but, on the contrary, is intended to cover various modifications and equivalent arrangements included within the spirit and scope of the appended claims.

The entire disclosure of Japanese patent application 2003-276149 filed on Jul. 17, 2003 including the specification, claims, drawing, and summary is incorporated herein by reference in its entirety.

What is claimed is:

1. A broad-band light source, comprising:
(a) an optical waveguide that:
 (a1) comprises at least one optical active element that generates an ASE lightwave when a pumping lightwave is supplied;
 (a2) outputs an ASE lightwave in a first wavelength band from a first end of the optical waveguide; and
 (a3) outputs an ASE lightwave in a second wavelength band from a second end of the optical waveguide, wherein the first end and the second end are different portions of the optical waveguide;
(b) at least one pumping lightwave-supplying means for supplying a pumping lightwave to the at least one optical active element; and
(c) a lightwave combining means that:
 (c1) receives the ASE lightwave in the first wavelength band at a first input port;
 (c2) receives the ASE lightwave in the second wavelength band at a second input port;
 (c3) combines the received ASE lightwaves to produce a resultant ASE lightwave; and
 (c4) outputs the resultant ASE lightwave.

2. A broad-band light source as defined by claim 1, wherein:
   (a) the optical waveguide comprises a plurality of optical active elements;
   (b) the at least one pumping lightwave-supplying means is at least two pumping lightwave-supplying means; and
   (c) at least one of the at least two pumping lightwave-supplying means supplies a pumping lightwave at an intermediate position of the optical waveguide.

3. A broad-band light source as defined by claim 1, wherein the optical waveguide comprises:
   (a) a plurality of optical active elements; and
   (b) an optical isolator placed at an intermediate position of the optical waveguide.

4. A broad-band light source as defined by claim 1, wherein:
   (a) the optical waveguide comprises a plurality of optical active elements; and
   (b) each of the optical active elements has a composition different from one another.

5. A broad-band light source as defined by claim 4, wherein the optical active elements comprise:
   (a) an optical active element co-doped with the elements Er and Al in the core region; and
   (b) an optical active element co-doped with the elements Er, P, and Al in the core region.

6. A broad-band light source as defined by claim 1, wherein:
   (a) the lightwave-combining means is a 2×2 coupler that:
      (a1) has two input ports and two output ports; and
      (a2) has a specific branching ratio;
   (b) one of the two input ports is connected to the first end of the optical waveguide; and
   (c) the other input port is connected to the second end of the optical wave guide.

7. A broad-band light source as defined by claim 1, wherein:
   (a) the lightwave-combining means is an optical coupler that has first and second input ports and one output port;
   (b) the first input port is connected to the first end of the optical waveguide;
   (c) the second input port is connected to the second end of the optical waveguide; and
   (d) the transmission property from the first input port to the output port has an intensity peak in said first wavelength band and the transmission property from the second input port to the output port has an intensity peak in the second wavelength band.

8. A broad-band light source as defined by claim 1, wherein the optical waveguide comprises (a) a first optical fiber in which the ASE lightwave in the first wavelength baud is amplified, (b) a second optical fiber in which the ASE lightwave in the second wavelength band is amplified, and (c) an optical isolator mediates between the first optical fiber and second optical fiber, and
wherein the first optical fiber and the second optical fiber constitute an optically continuous waveguide as the optical waveguide.

* * * * *